United States Patent [19]

Giers

[11] 4,015,480
[45] Apr. 5, 1977

[54] BALANCING METHOD AND APPARATUS

[75] Inventor: Alfred J. Giers, Rossdorf, Germany

[73] Assignee: Carl Schenck AG, Darmstadt, Germany

[22] Filed: Nov. 26, 1975

[21] Appl. No.: 635,722

[30] Foreign Application Priority Data

Dec. 14, 1974  Germany .......................... 2459282

[52] U.S. Cl. ................................ 73/462; 235/151.3
[51] Int. Cl.² .......................................... G01M 1/22
[58] Field of Search ..................... 73/462; 235/151.3

[56] References Cited

FOREIGN PATENTS OR APPLICATIONS 979,013  1/1965  United Kingdom ................. 73/462

Primary Examiner—James J. Gill
Attorney, Agent, or Firm—W. G. Fasse; W. W. Roberts

[57] ABSTRACT

The present balancing method measures instantaneous analog unbalance representing signals and converts these signals into digital signals. The conversion involves multiplying the measured signals with reference values at least three times within each period of a reference signal. Said reference values are sine or cosine values of an oscillation having the same frequency as the unbalance vibration. The sine and cosine reference values are taken at points of time corresponding to the respective multiplication point of time. The products of all individual multiplications are separately summed for sine and cosine values and at least for one period of the reference signal. Thereafter mean values are formed from the two sums. The just mentioned signal processing steps are performed by digital circuits including digital multipliers, digital summing networks, digital mean value formation circuits, as well as a clock signal generator.

24 Claims, 4 Drawing Figures

BALANCING METHOD AND APPARATUS

BACKGROUND OF THE INVENTION

The invention relates to a method and apparatus for balancing the unbalance of rotational bodies, wherein the measured values are ascertained and processed by means of electro-mechanical measuring transducers, reference signal generators, and multiplication devices.

In prior art balancing methods it is usual to ascertain the unbalance electrically in two measuring planes. The forces caused by the unbalance are transmitted to the bearings of the rotating body to be balanced and respective unbalance signals are evaluated and processed by electrical means. Load cells, displacement pick-up means, and speed transducers may be used for ascertaining the unbalance values which will be referred to hereafter as measured signals or values. The measured signals provided by the detectors or transducers normally comprise in addition to the unbalance information a mixture of oscillations. These measured signals are processed in analog electrical circuits. Such analog measured signal processing normally provides values for the unbalance of the body being tested by indicating the size and angular position of the unbalance, or by indicating components thereof, mostly in two measuring planes. The unbalance values, or rather the signals representing the unbalance values may be transmitted relative to correction planes through the rotor, they may be indicated, registered and held ready for further processing or for controlling the unbalance correction. The correction is normally accomplished by the balancing machine, which automatically starts and controls the correction procedure.

Conventional balancing methods operate relatively slowly especially if complicated balancing problems are to be solved and if a high precision in the balancing must be maintained. Thus, prior art balancing methods may require a substantial length of time for permitting the balancing. Substantial and complicated balancing problems also require complicated electric circuits. The production of such circuits and their operation may involve errors which falsify the measured results or which may interfere with the testing sequence. Another drawback of analog balancing devices is seen in that it is not possible to directly connect these devices to a central data gathering and data processing system, for example, to control the mass production of rotors or the like.

German Patent Publication 1,298,735 discloses an apparatus wherein the working tools for the unbalance correction are controlled by a digital device. However, the unbalance itself is ascertained and processed by analog means.

OBJECTS OF THE INVENTION

In view of the foregoing, it is the aim of the invention to achieve the following objects singly or in combination:

to provide a balancing method which delivers the unblance information directly in digital form and without any detour through an analog method;

to provide a balancing method which operates reliably at high speed and with precision so that the method may be employed even for complicated balancing requirements;

to simplify the operation of a balancing method to thereby substantially avoid or reduce any operating or human errors;

to provide means for selecting reference values in such a manner that the precision of the balancing method may be adapted to different requirements;

to standardize the circuit blocks employed for the processing of the measured values in connection with balancing machines so that a simplification, as well as a substantial adaptability of the balancing equipment is accomplished with regard to different balancing problems; and to provide a method and apparatus for balancing the unbalance or rotary bodies, which method and apparatus are directly compatible with a central electronic data processing system, for example, for controlling and monitoring the production especially where the mass production of rotating bodies is involved.

SUMMARY OF THE INVENTION

According to the invention the above objects have been achieved by multiplying the measured instantaneous unbalance signals, which are superimposed by undesired extraneous vibrations, at least three times within the period of a reference signal with reference values, whereby these reference values are the sine and cosine values corresponding to the respective multiplication point of time, and derived from an oscillation having the same frequency as the unbalance oscillation. The products of the individual multiplications are summed up separately as sine and cosine values, at least over one period of the reference signal, whereupon a means value is formed from the two separate sums, and all the individual operations are performed in a digital manner.

The repeated multiplication of instantaneous values of the measured signal withe reference signals, their separate summing as sine and cosine values and the mean value formtion, whereby all these steps are performed in digital manner has the advantage that the unbalance information is directly available in digital form, whereby high speed data processing for ascertaining the unbalance may be employed. This feature is especially advantageous in connection with automatically operating balancing machines and could not be attained by prior art methods. Another advantage of digitally ascertaining the unbalance information is seen in that the precision of the balancing may now be easily adapted to any particular requirements simply by selecting suitable method steps, for example, by increasing the number of multiplications within a summing time duration. By selecting the reference values corresponding it is possible to adapt the balancing precision to different requirements. Yet another advantage is seen in that even complicated balancing problems which heretofore could be solved only at substantial expense, may now be solved according to the invention in a rapid and reliable manner. Furthermore, the apparatus according to the invention may be realized in many instances at lower costs and performing the present method is also likely to be less expensive than prior art methods in view of the technical advance achieved in the production of electronic circuit elements and computer devices.

The apparatus for performing the present method comprises, according to the invention, a digital multiplier, a digital summing and mean value forming network, as well as a clock signal generator for controlling the multiplication sequence of measured signals and reference values. Such an arrangement comprising predominantly digital circuit elements and circuit blocks, makes it possible to standardize the data processing of measured values in balancing machines, whereby simultaneously a substantial adaptability relative to different balancing problems is provided. Another advantage of the invention is seen in that several balancing machines may be connected to an apparatus according to the invention which may in turn cooperate with a central electronic data processing system. Thus, the invention is particularly useful for controlling and monitoring large scale manufacturing operations. Advantageously, the multiplication device comprises digital memory means for the measured values and for the reference values. This feature minimizes the requirements for making the reference values available. In addition, it is possible to store any desired correction values.

Preferably, the apparatus according to the invention comprises holding circuits arranged ahead of the multiplication device for the simultaneous receiving and storing of the analog measured signals from the measuring transducers and of the analog reference values. The holding circuits make it possible to sequentially convert the measured analog signals representing the unbalance and the analog reference values into respective digital values. Thus, a single analog to digital converter may be employed for this purpose. Such an analog to digital converter will be arranged upstream, as viewed in the direction of signal flow of the multiplication device and downsteam of the holding circuits. Preferably, a measuring point selector switch will be arranged at the input of the A-D converter.

BRIEF FIGURE DESCRIPTION:

In order that the invention may be clearly understood, it will now be described, by way of example, with reference to the accompanying drawings, wherein.

DETAILED DESCRIPTION OF PREFERRED EXAMPLE EMBODIMENTS:

The described, preferred embodiment refers to the balancing of rigid rotors in two planes. All elements relating to the first plane are provided with the index $a$. All elements relating to the second plane are provided with the index $b$. However, the present teaching may equally well be employed in connection with the balancing in a single plane or in connection with the balancing in more than two planes of a rotating body.

Figure 1:
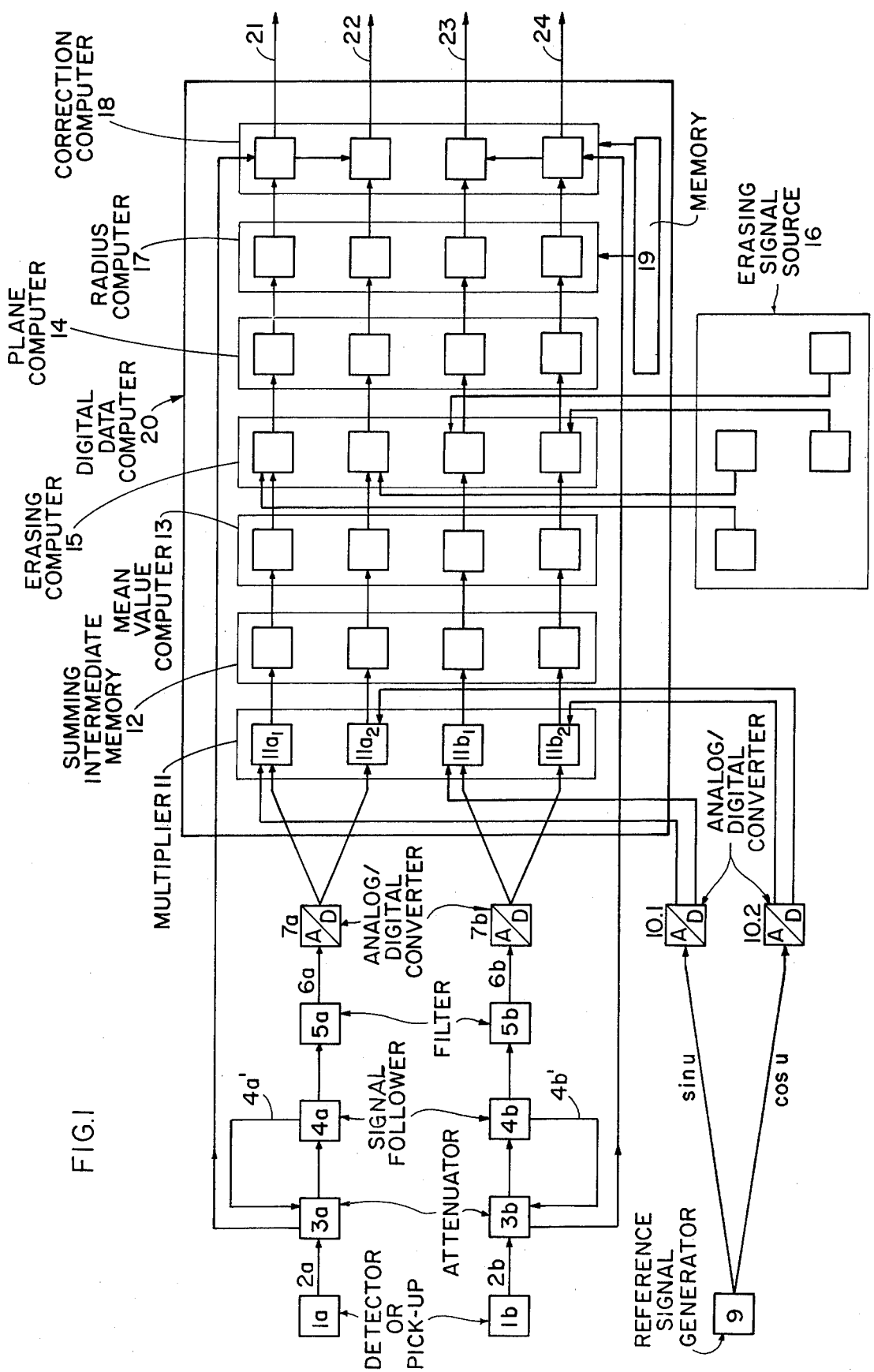
FIG. 1 is a circuit block diagram illustrating the method steps according to the invention in a circuit arrangement according to the invention.

Referring to FIG. 1, the unbalance detectors $1a$, $1b$ are connected to a conventional balancing machine, not shown. These detectors or pick-ups $1a$, $1b$ may be of any conventional design. For example, load cells or so called vibration pick-ups operating on the moving coil principle would be suitable for the present purpose. The output voltage of a moving coil vibration pick-up is directly proportional to the vibration velocity. The output signals $2a$, $2b$ from the pick-ups in the form of alternating voltages are supplied to attenuators $3a$, $3b$. These output signals represent the unbalance. Normally these unblance representing signals have superimposed thereon a noise component of varying frequencies. This noise component represents unwanted extraneous oscillations. Such attenuators are well known in the art, for example, so called rheostats may be used. The attenuators may operate in steps or stepless, that is in a continuous manner. The attenuators may be adjusted by hand or automatically. For the latter purpose, the output of the attenuators $3a$, $3b$ is connected to a respective signal follower circuit $4a$, $4b$. Such signal folower circuits are known in the art and comprise normally a peak detector connected with its output to two trigger or comparator circuits arranged in parallel, one comparator being biased for high level detection, whereas the other is biased for a low level detection and the control output $4a'$, $4b'$ of each signal follower is connected to its respective attenuator for the automatic adjustment of the latter in response to the signal level provided at the output of the attenuators. If the voltage at the output of the attenuator exceeds a certain value, the respective signal follower will automatically adjust its attenuator until the signal is again within a predetermined level. Such level may be determined, for example, with regard to the control range of the following circuit elements, and the adjustment will always keep the signal amplitude within the control range of the following circuit elements. In the illustrated embodiment the signal followers $4a$, $4b$ automatically adjust the attenuators $3a$, $3b$ respectively until any over-control of the following circuit elements is eliminated. In a modification of the shown circuit embodiment the signal followers $4a$, $4b$ may be inserted just downstream of the correction computer 18. A device suitable for performing the functions of the correction computer 18 is known under the model number TMS 0117 NC manufactured by Texas Instruments, Inc., Dallas, Tex., as a 10 digit decimal arithmetic processor. Such a processor is illustrated in the respective block 78 in FIG. 1.

The signal follower circuits $4a$, $4b$ are connected with their outputs to analog filters $5a$, $5b$. Such filters are conventional and are, for example, described in "Electronic Designers Handbook", Section 16, McGraw-Hill Co., 1957. If desired, the filters $5a$, $5b$ may be inserted between the attenuators and the signal followers. Under certain circumstances the filters may not have to be used at all. Their use will depend on the size of the noise ratio. If the following circuit means are not designed to process any noise ratio, it is advisable to use the respective filters. Thus, for example, where the noise components comprise rather high frequencies a low pass filter would be used. However, no specific requirements must be met by the frequency response characteristic of the filter, because it is quite easy to correct any filter transmission factors in connection with a correction computation to which the signal will be subjected in its processing. For example, force measuring balancing machines, which are so called "hard bearing" balancing machines, involve high frequency noise components.

The preprocessed measured voltages at the outputs $6a$, $6b$ are supplied to the inputs of an analog to digital converter (A-D converter) $7a$, $7b$. The converter converts the analog measured signal including the useful unbalance component and the noise component into digital values at points of time which may be determined by a clock signal generator forming part of the A-D converter. It is also possible to connect the clock signal generator to a reference signal generator, for example, reference signal generator 9, to produce a predetermined number of pulses for each revolution of the body to be balanced. The operation of the reference signal generator 9 is controlled by the rotation of the body to be balanced. For simplicity's sake the connection between the rotating body to be balanced and the reference and clock signal generators is not shown. Each pulse produced by the clock signal generator causes an analog to digital conversion of the instantaneous analog values into respective digital values, as will be described in more detail below with reference to FIG. 3.

Suitable analog to digital converters for the present purpose are described in "Analog-Digital Conversion Handbook", published by Analog Devices Inc., Norwood, Mass. 02062. The reference signal generator 9 may comprise, for example, a two phase sine wave generator of a type customary in balancing equipment and driven by the rotor to be balanced as mentioned above. Instead of producing a sine voltage the reference signal generator may produce one or several pulses for each revolution of the body to be balanced. In any event, the reference signal generator produces a signal by means of which the angular position of the body to be balanced is fixed.

In order to determine the unbalance of a rotational body, the measured voltages are multiplied by sine and cosine analog reference voltages when the so called multiplying method is employed. According to the invention, the instantaneous values of the measured voltages are multiplied with reference values. These reference values are the digital sine and cosine values which correspond to the respective multiplication point of time. In the alternative, the reference values may approximate the just mentioned sine and cosine values to any desired degree and such approximation reference values may be derived from an oscillation corresponding in its frequency to that of the unbalance oscillation.

The reference signal generator 9 produces in the illustrated embodiment a sine reference voltage sin-$u$ and a cosine reference voltage cos-$u$. These reference voltages are employed as reference signals and are simultaneously used for producing the reference values. The two voltages sin-$u$ and cos-$u$ are supplied to analog to digital converters (A-D) 10.1 and 10.2 where they are converted into respective digital values simultaneously with the conversion of the measured voltages in the converter 7a, 7b. The point of time at which the conversion takes place are determined by the clock signal generator (not shown), whereby at least three conversions are to take place for each period of the reference signal. In other words, for each revolution of the body to be balanced, at least three conversions will take place.

The output teminals of the digital converters 7a, 7b, 10.1 and 10.2 are connected to respective inputs of a multiplier 11, which is part of a data computer 20. Such a multiplier, may for example, be one known under the model no. TMS 0117 NC, which multiplies the measured values with the reference values. The combination of measured values and reference values is such that the instantaneous digital measured value for each measuring plane is multiplied with the corresponding digital sine and cosine reference value, so that four products are provided for the two measuring planes. The block diagram of FIG. 1 signifies the four multiplication values by providing respective four channels, namely, 11a1, 11a2, 11b1, and 11b2. Channels 11a1 and 11a2 correspond to the first measuring plane $a$ and channels 11b1 and 11b2 correspond to the second measuring plane $b$. Which may be of the type No. P 2100 by Hewlett-Packard Each measured value is multiplied with the sine reference values in channels 11a1 and 11b1 whereas each measured value is multiplied with the cosine reference values in channels 11a2 and 11b2. The outputs of the multipliers are connected to respective intermediate storage or memory means 12 where the values are summed over a summing period. The processor 20 of the above mentioned type includes such intermediate summing memory means. The four sums are supplied from the memory to respective mean value computing circuits 13. The means value is computed by dividing the sums by the number of multiplications performed during each summing time period or by the number of sensings taken during each summing period or summing duration.

According to the invention, at least three measuring signals are sensed or three multiplications are performed for each period of the reference signal in order to ascertain the size and angular position of the unbalance vibration or oscillation. However, in order to increase the precision of the operation, the number of sensings or rather the number of multiplications per period may be increased as desired. The increasing of the multiplications is also a suitable expedient to compensate for a non-uniform distribution of the sensings or rather multiplications over a period of the reference signal. This non-uniform distribution may, for example, occur when the reference signal from the reference signal generator 9 and the signal from the clock generator in the A-D converter 7a, 7b are not precisely synchronized with each other. For the same reason it may be advantageous to produce the mean value over a number of periods which is as large as possible.

A large number of sensings and a correspondingly large number of multiplications per period of the reference signal is also desirable when it is intended to eliminate noise vibrations having higher frequencies. In order to suppress a noise vibration of a given frequency, it is necessary that at least two sensings take place for each period of such noise vibration.

According to a further feature of the invention the mean values need not be produced over a single period or an integral multiple of a single period, but rather the duration of the time during which the summing and mean value formation takes place may be varied, whereby the mean value of the total time duration corresponds to one period of the reference signal. This type of mean value formation may be performed in a manner similar to that described above. Further, it may be advantageous not to form the arithmetic mean value but rather to perform the computation with the smallest error squares.

As a result of the multiplication and of the mean value formation there are now available four digital values which represent the components of the vibration having a frequency corresponding to the r.p.m. and relating to the respective measuring plane, whereby the components are represented in a rectangular coordinate system. These four digital values are supplied to a so called plane computer 14 which is also part of the data processor 20. It is the purpose of the plane computer 14 to compute from the two oscillation components the two rotor unbalance components relative to given correction planes in the rotor. Such computation may be accomplished in known manner, for example, in connection with force measuring balancing machines, whereby the spacings between the measuring planes and the correction planes are taken into account. The respective parameters may, for example, be supplied through a keyboard to suitable peripheral devices or the parameter may be made available in any other suitable manner for the plane calculation, for example, from suitable memories. Subsequent to the computation, the unbalance components are available in digital form and related to two given correction planes. If the apparatus according to the invention is employed in connection with a displacement measuring balancing machine "soft bearing machine", it is necessary to empirically adjust the plane computer.

Such empirical adjustment may easily be accomplished by employing initially for the adjustment a balanced rotor or by simulating a balanced rotor. For the adjustment a so called erasing or compensating computer 15 is arranged between the mean value computer 13 and the plane computer 14. The erasing computer has four channels which deduct during the adjustment a digital value from the value appearing at the output of the mean value computer 13 so that the output signal will be zero. The erasing pulses may, for example, be provided by an erasing or compensator signal source 16 which derives the erasing signals or pulses from the digitized reference signals.

For most practical purposes, it is not necessary to ascertain the unbalance itself, rather it is sufficient to ascertain the size of the required correction, in other words, to ascertain the respective mass relative to a balancing or correction radius. Thus, the output of the plane computer 14 is connected to a radius computer 17, which in turn is, for example, connected to a memory 19 or which may be controlled by the operator manually to provide for each correction plane a radius value. The radius computer 17 divides the measured values by the radius values and multiplies it with a scale factor. As a result, one obtains the components of the balancing masses for the two balancing or correction planes directly in the units determined by the scale factor. The scale and radius values may be supplied by the memory 19 or by adjustment through the operator.

In many instances it is desirable to influence the unbalance signal prior to its display or prior to its further processing. Thus, the unbalance signal may be passed through a correction computer 18, which is also a part of the signal or data computer 20 mentioned above. The correction computer may take into account especially errors inherent in the mechanical or measuring components of the balancing machine, or which are inherent in the system. Most of these errors will involve frequency responsive elements. Such errors are measured once and stored, for example, in the memory 19. Such errors may, for example, include the fact that the measured voltage of the vibration pick-up means is frequency dependent although the unbalance is the same. For example, the output voltage of load cells or force measuring means is frequency dependent is a square manner. In this instance, the r.p.m. of the body to be balanced is measured by means not shown and a correction value corresponding to the measured r.p.m. is called up or polled from the memory 19 for corresponding correcting the result. Another example to be mentioned here is phase or shifts errors of the vibration pick-up means. In this instance, the measured value is also corrected by a correction value which depends on the measured r.p.m. and which may be stored for instance in the memory 19. The frequency characteristic of the filters $5a$, $5b$ may also be corrected as mentioned above. This inverse frequency characteristic may be stored in the memory and employed as an r.m.p. dependent correction value. Further correction values may taken into account the measuring at speeds near the mechanical resonance of the body to be balanced. In this instance the increase of the mechanical amplitude measured in hard bearing machines may be taken into account.

Furthermore, certain corrections may be made which are not frequency proportional. An example of this nature is the adjusted position of the attenuator $3a$, $3b$. Thus, the digital values supplied to the input of the correction computer 18 may be multiplied by a value which is inverse to the adjustment position of the attenuator. In this manner it is possible to eliminate errors which might have been introduced through the attenuators.

The result of the above described method steps comprises the two components of the correction masses appearing in digital form at the outputs 20, 21, 22, 23 and 24 of the correction computer 18. These digital values are referenced relative to the two given correction planes and relative to the given correction radii. In addition, these values are provided in a rectangular coordinate system. Those signals or digital values may now be further processed in additional digital computing devices. For example, a recomputation into a different coordinate system, such as a polar coordinate system may be performed, and the values or signals may be employed for a control function. After recomputing these values into a polar coordinate system, they are available in their size and angular components. These values may be digitally displayed or they may be reconverted and displayed in an analog manner. Recomputation may also be performed into any other coordinate system, for example, for the purpose of a localized balancing (unbalance correction at defined points). Another recomputation may involve more than two correction planes having respective sectors designed for the unbalance correction. Further, these values may directly control the balancing machine to perform the correction procedure. In another further computation it is possible to take into account the eccentricity of an auxiliary shaft on which the body to be balanced may be supported. Thus, the eccentricity of the auxiliary shaft is deducted from the unbalance value. Yet another computation may involve adapting the output values to a suitable display scale, for example, the display may be on a logarithmic scale, and the recomputation would take the largest output component into account.

As a practical matter, the above described operations and devices starting with the multiplier 11 and the correction computer 18, with the exception of the erasing signal source 16, will be combined in a digital data computer 20. However, the described steps may be performed in a manner deviating from the described example. Thus, techniques well known in digital data processing may be employed, for example, a time multiplexing may be used including sequence programs and so forth. In addition, it is possible to perform the method steps related to the devices 14, 17, and 18 in a different sequence. For example, the correction computing may be performed subsequent to the formation of the means value and prior to the plane and radius calculation.

Where the reference values, as described with reference to FIG. 1 are sine and cosine voltages sin-$u$, cos-$u$ which must be converted from their analog form into digital values, it is practical to employ a measuring point selector switch. With the aid of such a switch it is possible to use but one analog to digital converter for converting the measured values, as well as the reference values. A circuit diagram of such an arrangement is illustrated in FIG. 2.

Figure 2:
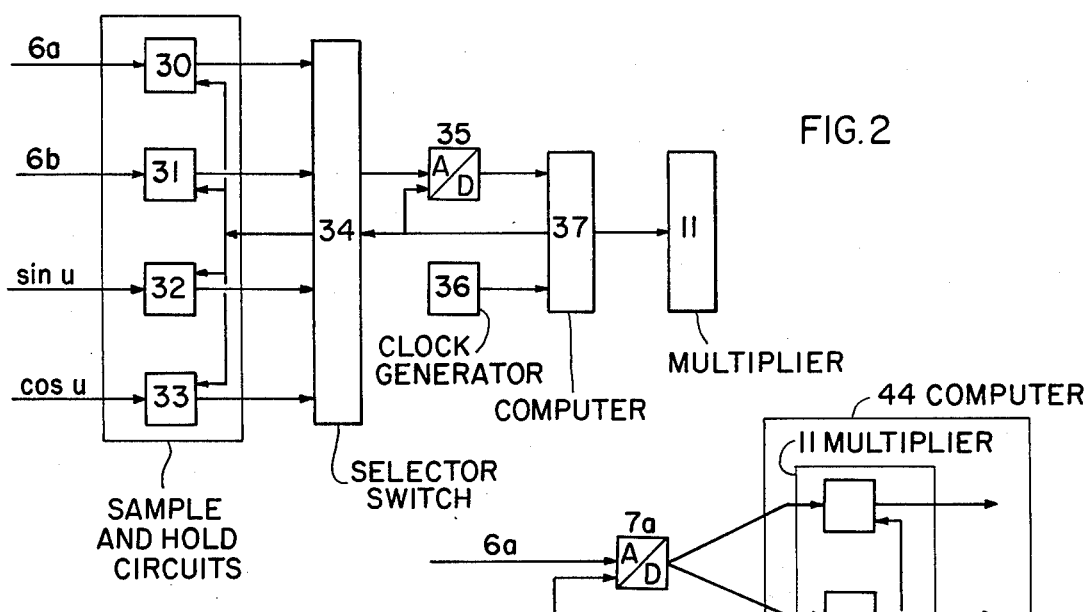
FIG. 2 illustrates a portion of the arrangement according to FIG. 1 with measuring selector switch means.

Referring to FIG. 2 the measured voltages 6a, 6b and the reference voltages sin-$u$ cos-$u$ are first supplied to four hold circuits 30, 31, 32, and 33. These hold circuits or so called sample and hold circuits may, for example, be realized by model SHC 23 or model SHC 85 produced by Burr-Brown, Tuscon, Ariz. These sample and hold circuits 30, 31, 32, 33 ascertain simultaneously four instantaneous values of the measured and reference voltages, and store these values during the converting time. A measuring point selector switch 34 supplies the respective instantaneous values to an A-D converter 35 which converts the values sequentially from analog into digital form. Such electronic selector switches 34 are, for example, described in "Application of Operational Amplifiers", McGraw-Hill Book Co., page 115, FIG. 4.5. The control of the sequential sensing of the hold circuits through the selector switch 34 and the sequential conversion is controlled through a clock generator 36 and a computer 37. This computer 37 also controls the feeding of the digitial values to the multiplier 11. The further steps are the same as described above with reference to FIG. 1. A suitable clock pulse generator for realizing the generator 36 is described, for example, in the just mentioned book "Application of Operational Amplifiers", pages 154 and 155, FIG. 5.8. The computer 37 may, for instance, be of the type HP 2100 manufactured by Hewlett-Packard.

Figure 3:
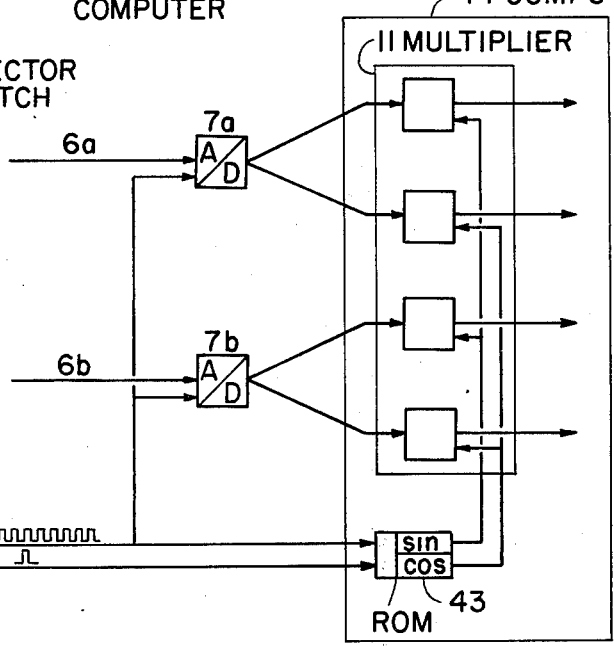
FIG. 3 illustrates the generation of the reference signals and of the reference values by means of a pulse generator and a memory.

FIG. 3 illusrates the generation of the reference signals and the reference values through a pulse generator 40 and a memory 43. The pulse generator 40 may be of the similar type as described above relative to generator 9. The pulse generator 40 provides for each revolution of the body to be balanced a single output pulse 41 which determines the begin and the end of a period corresponding to one revolution. Thus a phase reference is established. A further output 42 of the pulse generator 40 provides $n$ additional pulses uniformly distributed over the duration of one revolution or rather over the duration of one period. A memory 43 has stored therein sine and cosine values. This memory may be part of a computer 44 which in turn may, for example, be of the same type as mentioned above with reference to the computer 37. The digital sine and cosine values corresponding to each of the $n$ pulses from the output 42 of the generator 40 are polled from the memory 43 in response to these $n$ pulses determining respective points of time. These sine and cosine digital values are supplied to the respective multiplier stages in the multiplier 11 forming part of the computer 44. At the same time and in synchronism with the $n$ pulses, the analog measured values 6a, 6b are converted in the A-D converter 7a, 7b and supplied to the respective multiplier stages, where these values are multiplied with the corresponding digital sine and cosine reference values. The pulse generator 40 constitutes with its output 42 a clock signal generator which controls the sensing or measuring of the analog values 6a, 6b as well as the converting of these analog values into digital values, it also controls the polling of the sine and cosine values from the memory 42 and thus the multiplication of the measured values with the reference values. The further processing of the individual values takes place as described above with reference to FIG. 1.

Figure 4:
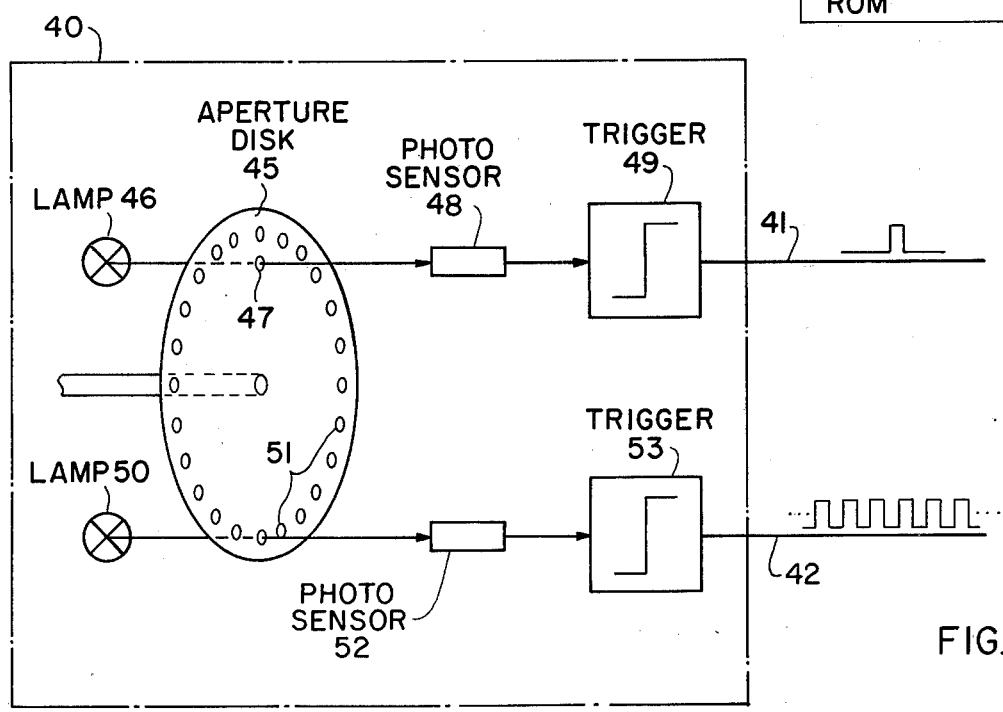
FIG. 4 shows an impulse generator suitable for practicing the invention.

Incidentally, the pulse generator 40 could be realized as shown in FIG. 4 wherein an apertured disk 45 is driven by the same shaft as the body to be balanced. A single light source 46 sends its light through an aperture 47 to be sensed by a photocell 48, which in turn actuates a trigger circuit 49, the output of which produces a single pulse 41 for each revolution of the disk 45 and thus of the body to be balanced. Similarly, a light source 50 sends its light through a plurality of apertures 51 to be sensed by a photocell 52 to actuate a trigger circuit 53 which produces at its output the pulse series 42 constituting the clock signal source as mentioned above. The memory 43 could be read only memory of the type IM 5600 manufactured by Intersil, Inc., Cupertino, Calif.

Depending on the desired quality of the measured result, one will determine the degree of approximation of the reference values relative to the precise sine and cosine values. As mentioned, for example, it is possible to employ instead of true sine and cosine values of square wave function or a staircase function.

Instead of using a disk with a plurality of holes for producing the clock pulses 42, it would be possible to employ a frequency multiplier connected to the output 41 of the signal generator 40. Such frequency multipliers are well known and may especially be used in connection with balancing revolutions per minute in a middle or high range. On the other hand, where the balancing speed revolutions per minute) is rather low, it is suitable to employ pulse generators, such as vibration pick-up directly secured to the body to be balanced for controlling the sensing of the measured values.

Another possibility of synchronizing the sensing with the polling of the reference values from the memory 43 could employ a clock signal generator such as 36, shown in FIG. 2, which in connection with the computer 44, would synchronize the A-D converter 7a, 7b and the polling of the reference values from the memory 43.

Incidentally, the erase signal source could, for instance, be realized by means of a coding-switching arrangement manufactured as model T 60-02 by Cherry Products, Corp. Highland Park, Ill.

Summarizing the foregoing disclosure of the invention, the mean values representing the unbalance components in the reference system determined by the reference signal, are made available according to the invention in digital form for the further processing. Such further processing may involve the digital display of the values, their storage on their recording. By repeatedly multiplying the measured unbalance signal, on which are superimposed extraneous undesirable vibrations, with corresponding reference values, within the period of the extraneous vibrations having the highest frequency, it is possible to eliminate from the measured signal the respective noise proportion, which periodically occurs with said highest frequency, Preferably, the measured unbalance signal is multiplied with the reference signal at points of time equally time spaced from each other.

The sine and cosine values used for the multiplication may approximate respective exact sine and cosine values to any desired degree. Thus, reference values derived from a rectangular waveform or from a stepped waveform may be used, whereby the multiplication and means value formation is simplified and the respective costs are reduced. The invention also suggests to vary the time duration during which the summation and mean value formation takes place, for ascertaining the measured value. Preferably, the mean value of said time duration during which the measured values are obtained should correspond to one period of the reference signal. This feature has the advantage that non-periodic noise components of the measured signal may be suppressed.

By making the individual intermediate sums of a summing sequence small, the required storage capacity in the computer may be reduced. Similarly, the required storage capacity may be reduced if during a summing sequence those multiplication values are added to each other which are spaced from each other by one half revolution of the body to be balanced. In this connection it is practical to store the individual multiplication products of one summing sequence or duration, in an intermediate memory.

It is also advantageous to provide the reference values in digital form. To this end analog values may be converted into digital values or the reference values may be generated in digital form initially. The digital reference values may also be made available in a polling mode of operation. Preferably the reference signal is supplied in the form of a single pulse per period, which pulse determines the beginning of the period and the end of the period. The reference signal may be supplied in the form of a sine alternating voltage and of a cosine alternating voltage whih constitute reference values and which are transformed into digital values for multiplication with the measured unbalance signal.

The points of time at which multiplication shall take place are predetermined by at least three reference signals which are uniformly spaced from each other over the multiplication sequence. Suitably, these pulses may be produced by an impulse generator and/or a frequency multiplier, or these pulses may be derived from a clock signal generator. By properly selecting the number of multiplications which shall take place within a summing sequence or within a summing period, it is possible to select any desired degree of precision of the measured results. Preferably, the measured signal is adapted or attenuated to the control or modulation range of the circuits through which the measured signal is to be processed, prior to transforming the measured signal into digital form. Such adaptation avoids an overriding or over-control of the signal processing circuits whereby possible measuring errors are eliminated.

Noise or extraneous undesired vibrations of higher frequency in the measured signal may be attenuated by filter means. This has the advantage that the ratio between noise and useful signal components may be kept small.

It is also practical to influence the unbalance information prior to its display or prior to its further processing, by at least one correction value which may be polled from a memory. Such correction of the measured value is especially effective to take errors into account which are inherent in the system, for example, in the mechanical or in the measuring portion of the balancing machine. Such errors which are inherent in the balancing system may, for example, involve measured voltages, which have a frequency depending characteristic, a phase error in the oscillation pickup means, the frequency characteristic of filters, or an increase in the mechanical amplitudes when approaching resonance and the like.

By digitally transforming the unbalance information into any desired reference system, it is possible to transform the information into correction planes or correction radii, thereby facilitating the control of the correction procedure. Although the invention has been described with reference to specific example embodiments, it is to be understood, that it is intended to cover all modifications and equivalents within the scope of the appended claims.

What is claimed is:

1. A method for determining the unbalance of a rotating body to be balanced and having an unbalance which causes an unbalance oscillation having an unbalance frequency, comprising producing instantaneous, unbalance representing signals, providing a reference signal having a reference period, said reference signal having a frequency equal to said unbalance frequency, producing reference values at least at three points of time during said reference period of the reference signal, said reference values representing or approximating sine and cosine reference values with respect to said reference period at said three points of time, miltiplying in a digital manner said unbalance representing signals with said sine and cosine reference values at said three points of time to produce respective sine and cosine products, separately summing in a digital manner said sine products at least during one period of said reference signal to produce a sine sum, separately summing in a digital manner said cosine products at least during one period of said reference signal to produce a cosine sum, and producing an unbalance indicating signal from said sine and cosine sums by digitally forming means values from said sums.

2. The method according to claim 1, wherein the formed mean values, which represent the unbalance components in the reference system defined by the reference signal, are made available in digital form for further use.

3. The method according to claim 1, wherein the unbalance representing measured signals, which have superimposed thereon noise components of varying noise frequencies, are multiplied repeatedly with the respective reference values during the period of the noise component having the highest noise frequency.

4. The method according to claim 1, wherein said digital multiplying takes place at equal time spacings.

5. The method according to claim 1, wherein said sine reference values and said cosine reference values approximate an exact sine and cosine value to any desired degree of precision.

6. The method according to claim 1, further comprising varying the time duration during which said summing and the mean value formation take place in such a manner that a respective mean time duration is equal to a period of the reference signal.

7. The method according to claim 1, wherein said summing is performed within a summing time duration in such a sequence that small intermediate sums are provided.

8. The method according to claim 5, wherein within any summing time duration those multiplication values are added up which are spaced from each other in time by one half revolution of the body to be balanced.

9. The method according to claim 1, further comprising storing the individual multiplication products produced within a summing time duration in an intermediate memory.

10. The method according to claim 1, further comprising providing the reference values in digital form.

11. The method according to claim 1, wherein the reference signal is provided as a single pulse at the beginning of each period.

12. The method according to claim 1, further comprising providing the reference signal in the form of a sine alternating voltage and in the form of a cosine alternating voltage, and deriving said reference values in digital form from said alternating voltages for multiplication with the unbalance representing signals.

13. The method according to claim 1, comprising determining said multiplication points of time by means of at least three pulses which pulses are uniformly distributed over a period of the reference signal.

14. The method according to claim 13, wherein said three pulses are derived from pulse signal means such as a generator, or a frequency multiplier, or a clock signal generator.

15. The method according to claim 1, further comprising attenuating the unbalance representing measured signals to the control of modulating range of the following circuits, prior to transforming the measured signal into digital form.

16. The method according to claim 1, wherein the unbalance representing measured signals have superimposed thereon extraneous noise components of varying noise frequencies, said method comprising attenuating noise components above a given frequency by means of filter.

17. The method according to claim 1, further comprising storing correction values in a memory and influencing the unbalance representing signals by at least one correction value prior to displaying or further processing.

18. The method according to claim 1, further comprising digitally transforming the balancing signals which represents the unbalance information into any desired reference system and displaying or using the balancing signal in digital form.

19. An apparatus for producing an unbalance representing signal for balancing a rotatable body to be balanced, comprising unbalance signal pick-up means to provide periodic unbalance representing signals, digital multiplier means having inputs and outputs, analog to digital signal converting means operatively interconnecting said pick-up means to said inputs of said multiplier means, digital signal summing means connected to said outputs of said multiplier means, digital mean value formation means connected to the outputs of said signal summing means for providing said unbalance representing signals, means providing reference values having values dependent upon the instantaneous angular displacement of said rotatable body, means applying said reference values to said multiplier means for multiplying said unbalance representing signals with said reference values, and timing means connected to said multiplier means for effecting multiplication therein at least at three predetermined points of time during a period of said unbalance representing signals.

20. The apparatus according to claim 19, wherein said digital multiplier means comprise digital memories for the unbalance representing signals.

21. The apparatus according to claim 19, wherein said digital multiplier means comprise a digital memory for said reference values.

22. The apparatus according to claim 19, further comprising sample and hold circuit means arranged upstream of the digital multiplier means for the simultaneous ascertaining and storing of the measured unbalance signals provided in analog form by said pickup means, as well as for the reference values provided in analog form by said timing means.

23. The apparatus according to claim 19, further comprising at least one analog to digital converter arranged ahead of the multiplier means for converting the signals measured by said pick-up means in analog form and for converting the reference values provided by said timing means in analog form.

24. The apparatus according to claim 23, further comprising measuring point selector switch means arranged downstream of the sample and hold circuit means and upstream of the analog to digital converter.

* * * * *